July 18, 1967
F. J. SIMAK
3,331,447
CONTROL SYSTEM FOR RAISING AND LOWERING TRACTOR IMPLEMENTS
Filed Dec. 9, 1964
5 Sheets-Sheet 1
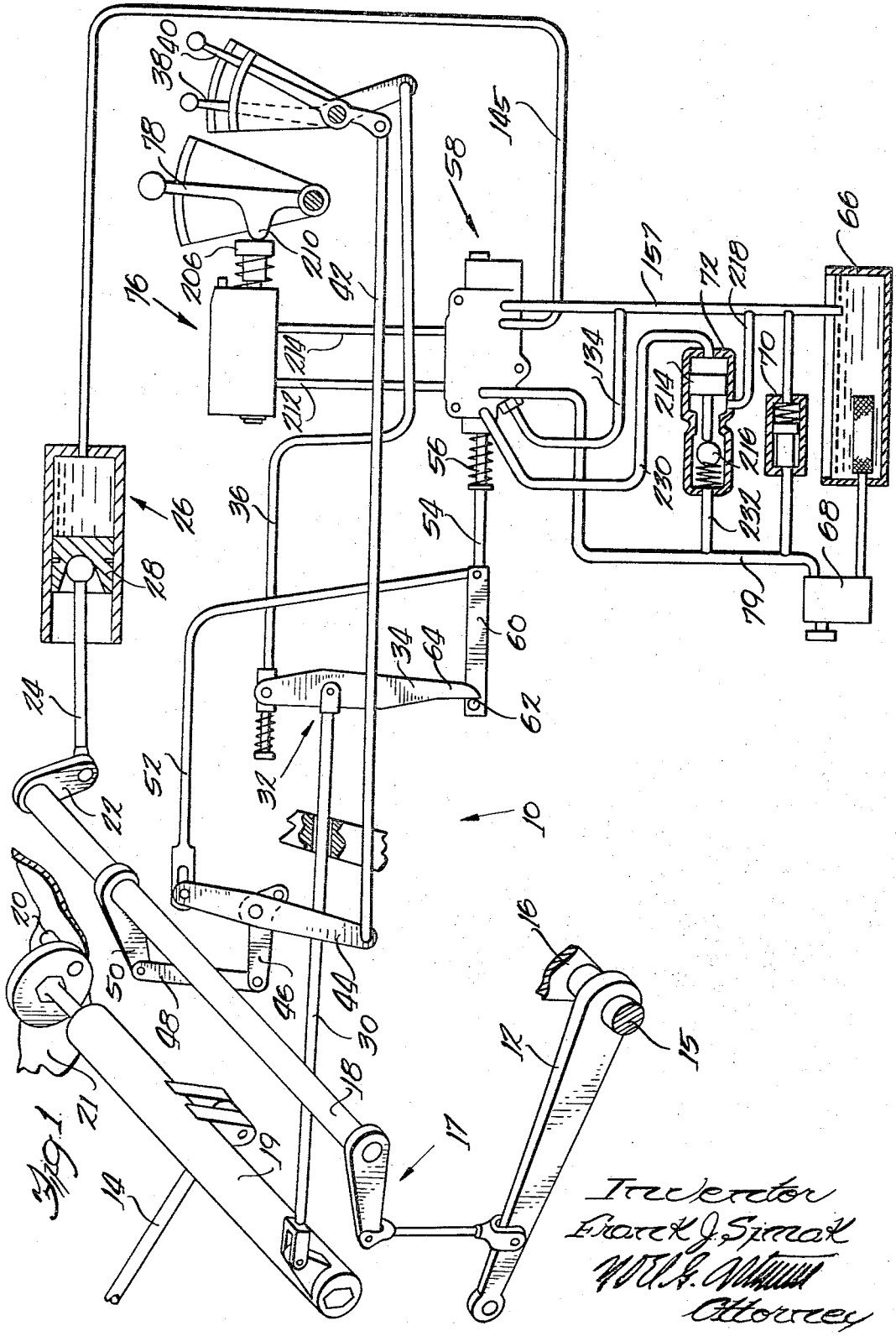
Inventor
Frank J. Simak
Attorney

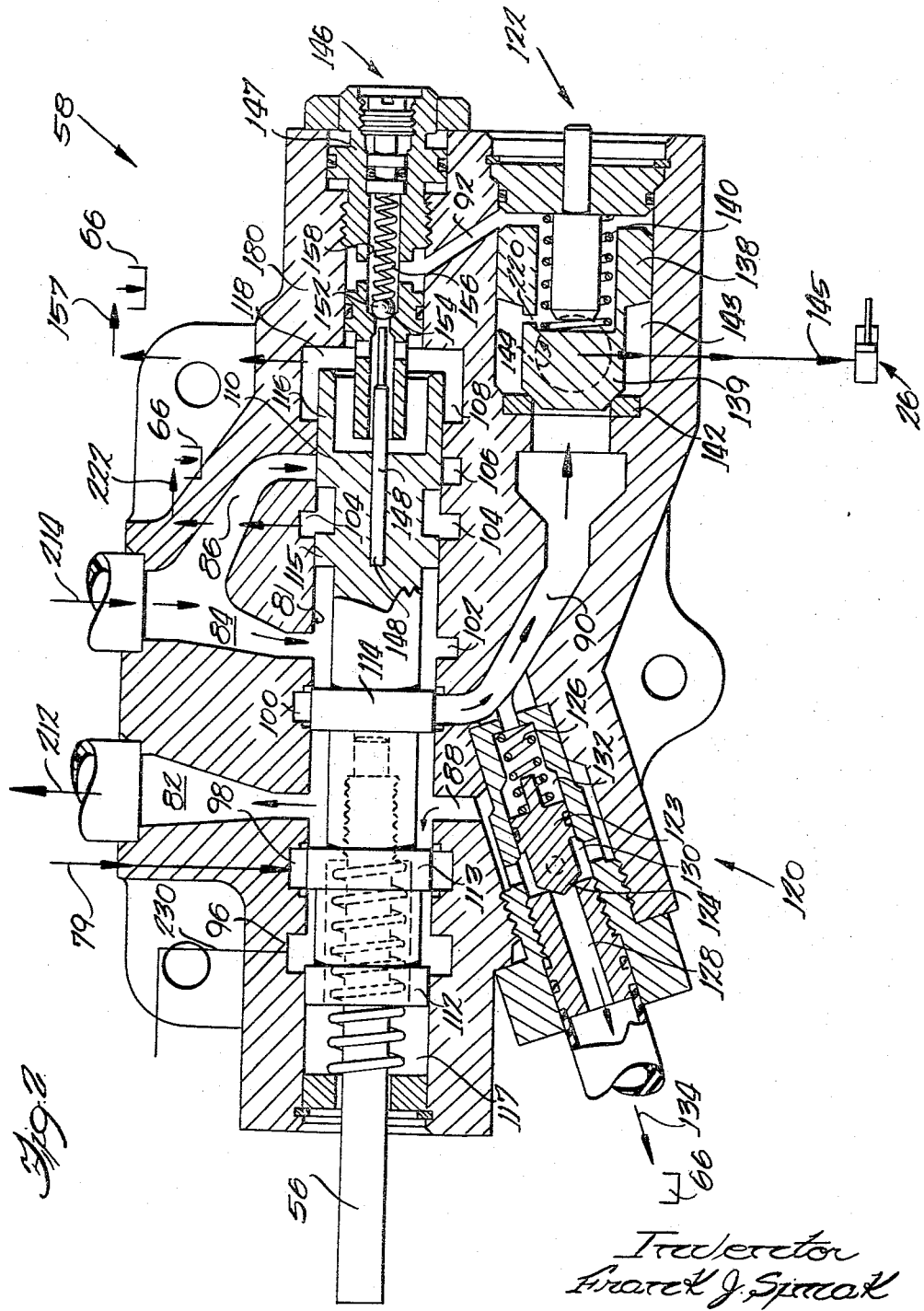

July 18, 1967
F. J. SIMAK
3,331,447
CONTROL SYSTEM FOR RAISING AND LOWERING TRACTOR IMPLEMENTS
Filed Dec. 9, 1964
5 Sheets-Sheet 3
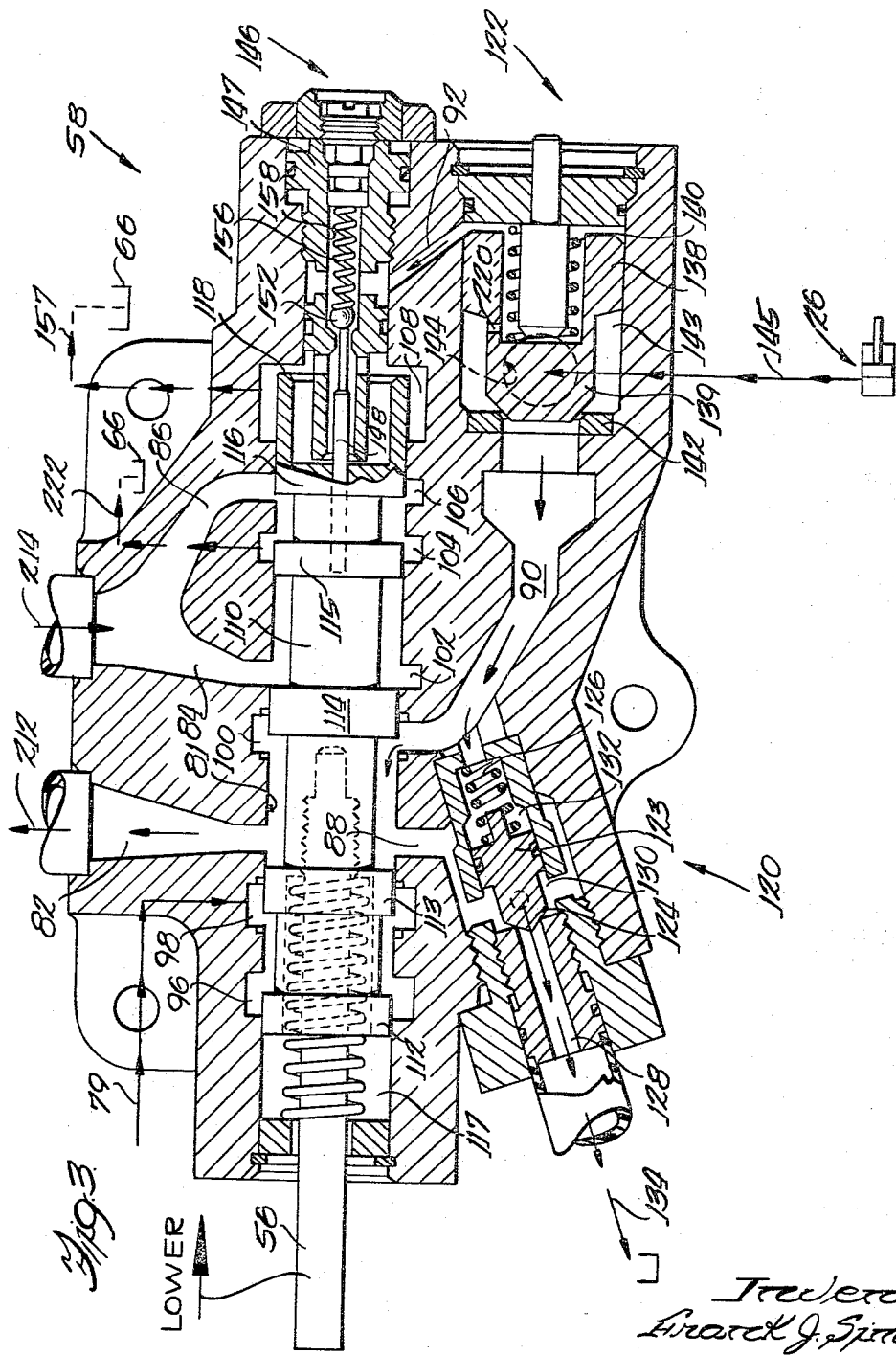

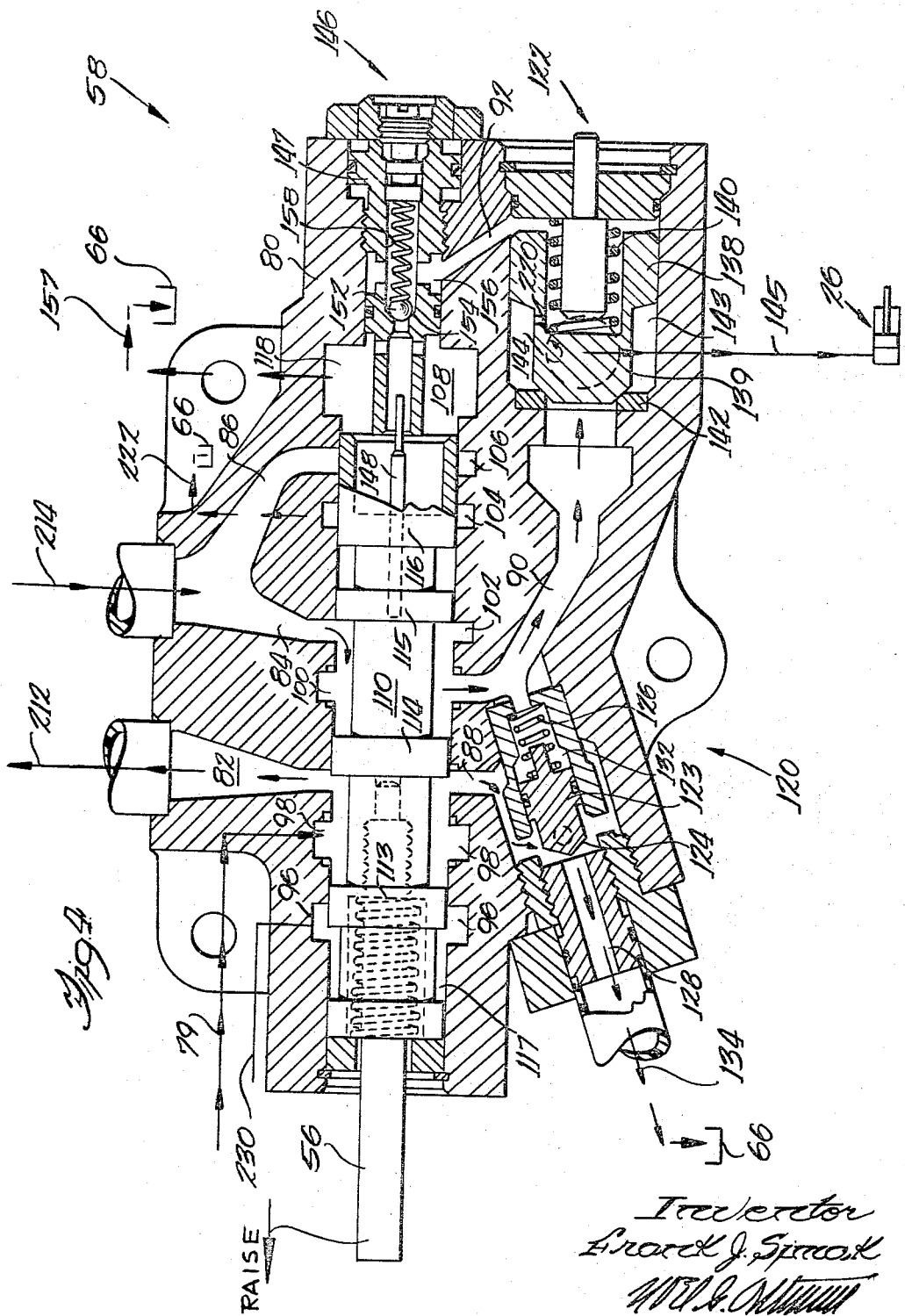

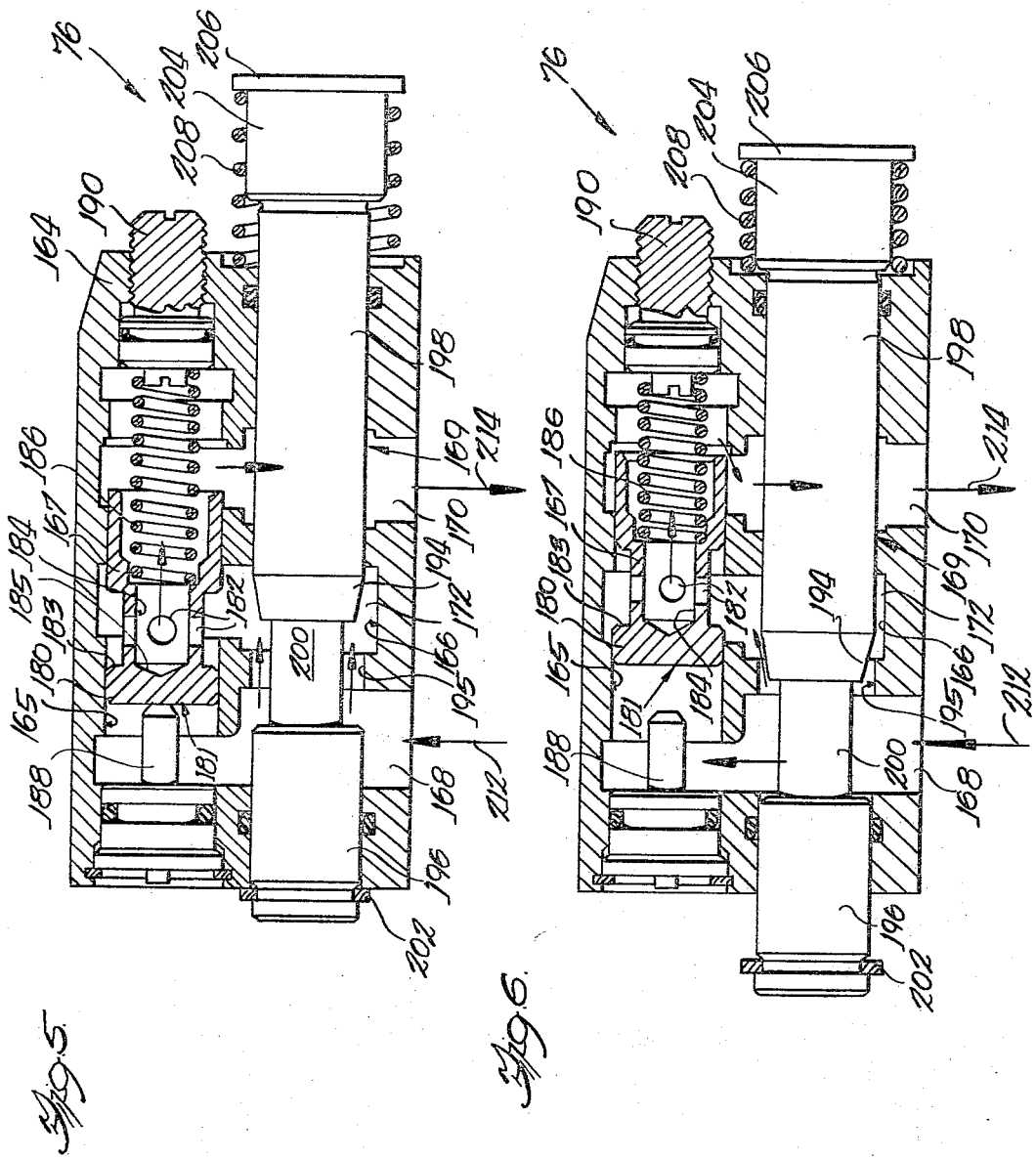

United States Patent Office 3,331,447
Patented July 18, 1967

3,331,447
CONTROL SYSTEM FOR RAISING AND LOWERING TRACTOR IMPLEMENTS
Frank J. Simak, Chicago, Ill., assignor to International Harvester Company, Chicago, Ill., a corporation of Delaware
Filed Dec. 9, 1964, Ser. No. 417,096
7 Claims. (Cl. 172—9)

ABSTRACT OF THE DISCLOSURE

A draft control apparatus having a manually operated directional flow control valve and a manually operated action control valve with an automatically acting pressure differential arrangement therein, the flow control valve and the action control valve being hydraulically interconnected to provide regulated fluid flow to a hydraulic cylinder for raising and lowering a tractor operated implement at various operator selected speeds.

---

This invention relates to hydraulic systems, and more particularly to draft and position controls for hydraulic systems used in raising and lowering tractor implements.

Hydraulic systems of the type referred to include a fluid motor for raising and lowering an implement with automatic controls to maintain the implement at a desired draft.

On actuation of the fluid motor, fluid is displaced from or supplied to a hydraulic ram to move the implement to a desired position. Heretofore, the rate at which the implement was raised was a variable factor dependent upon the weight of the implement, the size of the fluid motor, as well as the viscosity of the hydraulic fluid. This situation was generally acceptable where relatively light implements which correspondingly light power requirements were used. However, a problem was created with the recent introduction of larger, heavier implements with relatively larger pump power requirements. Actuation of the relatively larger hydraulic pump resulted in a sudden acceleration of the implement at full pump speed; the heavier implement raised so fast it tended to unbalance the tractor and tended to raise the tractor front wheels. The quick upward movement of the implement jerked the tractor suddenly, causing the tractor operator to lurch rearward to strike his kidney area against the tractor seat back rest. Further, the implement raised so fast as to draw the implement higher than desired; and a constant implement depth was not maintained.

Thus, it is an object of the invention to provide an improved hydraulic system having flow control means to control the speed at which a tractor implement is raised.

It is another object of the invention to provide a hydraulic system having flow control means to raise an implement attached to a tractor hitch at a selected, relatively, constant speed regardless of the implement weight or the viscosity of input flow rate of the hydraulic fluid.

It is a further object of the invention to provide a hydraulic system having flow control means suitable for use in raising or lowering a tractor associated implement at a predetermined constant speed.

Still another object of the invention is to provide a hydraulic system having means for varying the rate of flow of hydraulic fluid to and from a hydraulic cylinder to raise and lower a tractor implement at a selected constant speed.

Yet another object of the invention is to provide a hydraulic system having flow means to control the rate of flow of fluid to and from a hydraulic cylinder for raising and lowering an implement and to further provide pressure control means associated therewith to prevent a build-up of fluid pressure contributing to decreased system efficiency resulting in increased fuel consumption.

These and other objects of the invention will become apparent from the following description when considered in conjunction with the accompanying drawings, wherein:

FIG. 1 is a schematic representation of a draft and position control hydraulic system for use in raising and lowering tractor implements, including directional flow and action control valves embodying the principles of the present invention;

FIG. 2 is a sectional view of a directional flow control valve in accordance with the principles of the present invention;

FIG. 3 is a sectional view of the flow control valve illustrated in FIG. 2 with the valve shown in position for lowering an associated implement;

FIG. 4 is a sectional view of the flow control valve illustrated in FIG. 2 with the valve shown in position for raising an associated implement;

FIG. 5 is a sectional view of an action or flow rate control valve to control the speed at which the implement associated with the flow control valve is raised or lowered, with the valve shown in position for a fast raising or lowering of an associated implement; and FIG. 6 is a sectional view of the action control valve illustrated in FIG. 5 with the valve shown in position for a slow raising or lowering of an associated implement.

Referring now to FIG. 1, an associated agricultural implement, not shown, is connected to a tractor, not shown, by means of conventional draft and position control linkage indicated generally by the numeral 10 and including a pair of lower hitching links 12, one of which is shown, and an upper hitching link 14. The lower hitching links 12 are pivotally secured as at 15 to a tractor frame 16; and are connected by means of suitable linkage indicated generally at 17 to a rockshaft 18. A torsion spring 19 is anchored as at 20 to a portion of the tractor frame indicated generally at 21; and the torsion spring 19 is pivotally connected to the upper link 14. The rockshaft 18 is connected by means of a bellcrank 22 and rod 24 to a single acting hydraulic ram comprising a draft or control cylinder 26 including a piston 28 connected to the rod 24. A draft control rod 30 is pivotally secured at one end to the torsion spring 19 and at its other end to a draft control linkage designated generally by the numeral 32 and including a pivotal element 34 which is pivotally secured at one end to a spring biased rod 36 which is operated by a draft control lever 38.

A position control lever 40 is connected through suitable linkage including members 42, 44, 46, 48 and 50 to the rockshaft 18 and by means of elements 52 and 54 to a spool rod 56 of a directional flow control valve 58 constructed in accordance with the invention. Element 54 has an extension 60 with a pin 62 which abuts a lower end 64 of pivotal element 34. The conventional portion of the hydraulic system includes a fluid reservoir 66, a hydraulic pump 68, a safety valve 70 and a regulator valve 72. An action or flow rate control valve designated generally by the numeral 76 is operated by a controlling speed control lever 78 provided to selectively position valve 76. The pump 68 directs fluid under pressure from the reservoir through a line 79 to the directional flow control valve 58.

The directional flow control valve 58, FIG. 2, includes a housing 80 having a bore 81 opening to passageways 82, 84, 86, 90 and 92, the bore having a plurality of annular grooves or fluid chambers 96, 98, 100, 102, 104, 106 and 108 therein. A free floating, spring biased spool 110 having annular lands 112, 113, 114, 115 and 116 fits floatingly within the valve bore defining left and right chambers 117, 118 therein. The spool is connected at its left end, as viewed in the drawings, to the spool rod 56 which extends through the left end of the housing 80 and which is connected by means of element 54 to the draft and position control linkage.

In accordance with an important feature of the invention, the directional flow control valve 58, FIG. 2, includes a pressure compensator valve designated generally by the numeral 120. The valve 58 also includes a drop check valve designated generally by the numberal 122. The pressure compensator valve 120 has a spring-loaded piston 123 having a conical end 124 which is biased to the left by a spring 126 closing off a relief passageway 128. The compensator valve 120 has left and right chambers 130, 132 which are in communication respectively with passageways 88 and 90 of the directional flow control valve 58. Relief passageway 128 is in communication with and opens into an exhaust line 134 leading to the reservoir.

The drop check valve 122 includes a spring loaded piston 138 having a piston head 139 which a spring 140 maintains in position against seat 142, closing off communication of passageway 90 with a fluid chamber 143 defined within drop check valve 122 about the piston head 139 at the left end of piston 138. Fluid chamber 143 is in communication with the control cylinder 26 by means of a piston opening 144 connected to a cylinder line 145, FIG. 1.

A pilot check valve assembly designated generally by the numeral 146 is provided in the directional flow control valve 58 and includes a valve body 147 fitted within valve bore 81, a pilot stem 148 secured to the right end of the valve spool 110 for movement axially therewith, and a pilot check ball 152 maintained in position against its seat 154 by a spring 156 positioned within a body opening 158, the ball 152 thus blocking off communication of passageway 92 with right chamber 118 and groove 108 connected to the reservoir by a reservoir return line 157, FIG. 1.

Movement of the valve spool and pilot stem 148 to the right unseats the pilot check ball 152 and permits communication of chamber 143 through passageway 92 with chamber 118 and groove 108 to the reservoir. Fluid flows to passageway 92 through an orifice 220 and causes a pressure drop and an unbalance of forces, shifting piston 138 to the right allowing communication of passageway 143 with passageway 90.

Action control valve 76, FIG. 5, controls the speed at which a tractor associated implement is raised or lowered by regulating the rate of fluid flow to and from the draft control cylinder 26. The valve 76 includes a housing 164 with upper and lower bores or passageways 165, 166; a freely shiftable flow control piston 167 in the upper bore; and a manually adjustable tapered valve spool 169 in the lower bore.

The housing has inlet and outlet chambers 168, 170 and an intermediate chamber 172 connecting chambers 168 and 170, the three chambers being arranged transverse to and in communication with the bores 165, 166.

The flow control piston 167, FIG. 5, is shiftable to the left and right within the upper bore 165 and has a piston head 180, radial openings or passageways 182 and an axial opening or passageway 184 in communication with openings 182 and adapted to receive a spring 186 biasing the piston to the left in a neutral position permitting a relatively unrestricted flow of fluids through the outlet chamber 170. A piston stop 188 is fitted into one end of the upper bore to limit movement of the flow control piston to the left. An adjustable plug 190 is provided to close the other end of the bore and is manually adjustable to change the compression of spring 186.

Valve spool 169 fitting within the lower bore 166 includes a tapered flow metering portion 194, left and right lands or guide portions 196, 198 and an intermediate grooved portion 200 of relatively smaller diameter than the balance of the spool. A snap ring 202 about the left end of the spool limits movement of the spool to the right upon contacting the valve housing. The spool also has a right end portion 204 of relatively greater diameter than the balance of the spool to limit movement of the spool to the left. A spring 208 is positioned about the right end portion 204 between the valve housing and a flange 206 at the right end of the portion 204 and serves to bias the spool to a neutral position, as shown in FIG. 5.

Referring now to FIG. 1, the speed control lever 78 has a knob 210 thereon which contacts the spool flange 206 and serves as a connection by means of which the spool flow controller may be slidably positioned within the lower bore. Movement of the speed control lever to the left shifts the valve spool to the left from the neutral position shown in FIG. 5. FIG. 6 shows the spool actuated to the left in which position the tapered spool surface 194 fits closely into an opening 195 between chambers 168 and 172 to restrict incrementally the flow of fluids from chamber 168 into chamber 172.

The manner in which the action control valve 76 operates may now be described. Inlet chamber 168 of the action control valve 76 is connected to the passageway 82 of the main control valve by means of line 212, FIG. 1. With the tapered valve spool 169 in the fully open position shown in FIG. 5, actuation of the directional flow control spool 110 to the left to raise an agricultural implement causes hydraulic fluid to flow into the inlet chamber 168 of action control valve 76 to an area in the upper bore 165 around a left face 181 of the piston head 180. Fluid also flows into intermediate chamber 172 and upwardly into the upper bore 165, through piston openings 182, 184 into the outlet chamber 170, as indicated by the arrows in FIG. 5. Fluid flows from chamber 170 to passageway 84 of the directional flow control valve 58 by means of line 214, FIG. 1.

When the valve spool 169, FIG. 5, is in a predetermined open position and at a predetermined rate of flow of fluid into inlet chamber 168, the pressure of fluid against the left face 181 of the flow control piston is exactly balanced by the spring 186 and the pressure of fluid on the opposite face 183 and inner surface 185 of the piston head. With increases in the rate of fluid flow to chamber 168 above a predetermined rate of fluid flow, there is an increased pressure differential between chamber 168 and chamber 172 which overcomes the resistance of spring 186; and piston 167 moves to the right partially closing outlet chamber 170 and throttling or slowing down the rate of flow of fluid from chamber 170 thus dampening the effect of the greater flow to chamber 168.

Where it is desired to raise or lower an implement at a relatively slower speed, the speed control lever 78 is moved to the left, shifting valve spool 169 to the left as indicated in FIG. 6. As the tapered surface 194 moves to the left into the opening 195, it restricts the flow of fluid from chamber 168 into chamber 172 and creates an increase in pressure differential between these chambers with a relatively greater pressure in chamber 168 causing an unbalanced force on the left face 181 of the flow rate control piston 167, shifting it to the right where it restricts communication between chamber 168 and outlet chamber 170 causing a decreased rate of flow from chamber 170. The decrease in rate of flow of fluid from chamber 170 is controlled incrementally by the axial location of the spool tapered surface 194 with respect to opening 195. Thus, by manually controlling the axial position of the valve spool with the speed control lever 78, the rate of flow of fluid from chamber 170 to the directional flow control valve 58 and to the control cylinder 26 can be controlled.

Referring now to FIG. 2, movement of valve spool 110 axially within its bore 81 is controlled by the draft and position control levers 38, 40 which are connected to spool rod 56. With the spool 110 in a neutral position shown in FIG. 2, fluid under pressure from the pump 68, FIG. 1, flows through line 79 into valve groove 98. Pilot land 113 of the directional flow control valve spool 110 is narrower than housing groove 98 so that the land 113 can never completely cover the groove 98. Thus a small amount of fluid flows to the left about the spool into groove 96 and exhaust line 230 which is in communication with the right side of regulator valve 72, FIG. 1. Regulator valve 72 comprises a spring-biased ball valve operable by a piston 214; and flow of fluid to the right side of the valve 72 shifts piston 214 to the left, unseating a ball 216 of valve 72, permitting the main flow of fluid from pump 68 to flow through line 232 to regulator valve 72 and through a return line 218 to reservoir 66.

Now consider that it is desired to raise an agricultural implement, not shown, connected by the linkage 10 to control cylinder 26. Position control lever 40, FIG. 1, is moved to the left to move spool rod 56 and valve spool 110 of the directional flow control valve 58 to the left. Referring now to FIG. 4, with the valve spool shifted to the left to raise an implement, hydraulic fluid is directed into chamber 98 and through passageway 82 and line 212 to the action control valve 76, then through line 214 to passageway 84. Passageway 84 of the directional flow control valve 58 is open to permit the fluid to flow around spool 110 into passageway 90 where the pressure of the fluid overcomes the resistance of the spring 140 of the drop check valve 122, moving piston 138 to the right off its seat 142 permitting a flow of fluid into chamber 143 about the piston head 139. Fluid continues to flow through piston opening 144 and line 145 to the control cylinder 26 where the fluid moves the piston 28 within the cylinder 26 to lift the implement.

Referring now to FIG. 5, with the action control valve 76 in its fully open position, hydraulic fluid from the directional flow control valve 58 passes through action control valve 76 at a predetermined rate of flow. Where a relatively heavy associated implement is being used in working position below the surface of the ground, high pressure fluid from the directional flow control valve 58 flowing to the control cylinder 26 at full pump speed may cause so rapid an acceleration of the implement as to jerk the tractor, tending to raise the tractor front wheels jerking the operator to the rear where the back rest of the operator's seat hits him in the kidney area. To avoid this rapid implement acceleration, the tapered spool 169 of the action control valve 76 is shifted to the left by moving the speed control lever 78 to the left, resulting in a relatively slower raising or lowering of an associated implement. With the valve spool 169 shifted to the left, the restricted flow of fluid past the tapered spool surface 194 establishes an increased pressure differential between chambers 168 and 172 and results in an unbalanced force acting on the flow control piston 167. This unbalanced force overcomes a predetermined resistance or biasing force provided by spring 186 and causes piston 167 to move to the right where it partially closes off outlet chamber 170, the actual amount of flow restriction or closure varying in accordance with the pressure differential. The right hand portion of the flow control piston 167 thus acts as a variable restriction, throttling or slowing down the rate of flow through outlet chamber 170. The pressure differential is a function of the flow through opening 195 and is determined by the position of the tapered surface 194 of the valve spool 169 with respect to the opening 195. The actual rate of fluid flow from the outlet chamber 170 remains relatively constant despite variable input pressures or variations in the viscosity of the hydraulic fluid thus resulting in relatively constant predetermined raising or dropping speeds for implements of considerably varying weights.

Movement of the piston 167 as far to the right as it will go by reason of a relatively great pressure differential between chambers 168 and 172 does not completely close off the outlet chamber 170 and a predetermined rate of fluid flow sufficient to raise the implement passes through the main control valve. However, with decreased outlet flow rates the pump pressure tends to increase excessively resulting in a lowered system efficiency and an increased fuel consumption. In accordance with the invention, pressure compensator valve 120 is provided to increase the efficiency of the system and decrease fuel consumption due to an excessively high pressure differential between chambers 168 and 170.

Referring now to FIG. 2, a biasing spring 126 maintains the pressure compensator valve 120 in a closed position preventing the exhaust of fluid to the reservoir. However, when the force of fluid in passageway 88 exceeds the resistance force of spring 126 and the pressure of fluid in passageway 90, the piston 123 is shifted to the right as illustrated in FIG. 4. Movement of piston 123 to the right by the unbalanced forces permits the escape of some input fluid from chamber 98 and passageways 82, 88 through exhaust passageway 128 and line 134 to the reservoir 66. Consequently, a reduced flow of input fluid is available for the action control valve 76 resulting in a lower pressure differential across chamber 168 and intermediate chamber 172; the lower pressure differential results in a shifting of piston 167 to the left thus reducing the pressure drop between the inlet and outlet chambers 168, 170, and permitting lower input pressures. Thus, a pressure compensated controlled slow rate to the cylinder is achieved at a minimum of lost power.

To lower an implement, the directional flow control spool 110 is shifted to the right as illustrated in FIG. 3. In this position, valve spool 110 substantially occludes the annular fluid inlet groove 98 and moves the pilot stem 148 to the right to unseat the pilot check ball 152 permitting a flow of fluid from passageway 92 through body opening 158 to groove 108 and line 157 to the reservoir. Additionally, a very small amount of fluid from chamber 143 to the left of piston 138 flows through a piston orifice 220 through passageway 92 to the reservoir. This flow from about the piston to the reservoir creates a pressure differential between chamber 143 and passageway 92 and causes the drop check valve 122 to become unbalanced; and piston 138 moves to the right off its seat 142, opening chamber 143 which is in communication with control cylinder 26 through line 145, to passageway 90. Passageway 90 is in communication with passageway 82; and a flow of fluid from the control cylinder 26 is directed through line 145 and passageways 90 and 82 to the action control valve 76 which controls the rate of flow of the fluid as before described. Fluid from valve 76 flows into passageway 86 about spool 110 in valve 58 to groove 104 which is connected to reservoir by line 222.

Since the pressure of the fluid in passageway 90 is equal to the pressure of the fluid in passageway 88, the spring 126 maintains the compensator valve 120 in a closed position and permits no fluid to escape the system by this means. Thus, the flow control arrangement of the present invention permits an operator to select the speed at which an implement may be raised or lowered. Having once set the speed control lever 78 to select a particular speed at which he desires an implement to be raised and lowered the speed remains relatively constant despite variations in the weight of the implement or variations in working pressure or fluid viscosity. A pressure compensator valve insures that there is not an excessive loss of fluid pressure through the system, thus resulting in increased system efficiency and reduced power loss.

Since modifications of the details of the structure as illustrated in the various figures are contemplated, the invention should be limited only by the scope of the appended claims.

What is claimed is:

1. In a tractor and implement assembly including hydraulic power means to raise and lower the implement, said hydraulic power means including a fluid reservoir, a fluid pump, a control cylinder connected to said implement, and valve means to direct the flow of fluid between said fluid reservoir and said control cylinder, the improvement comprising: flow control means in communication with said valve means and operatively associated with said hydraulic power means to maintain a constant predetermined rate of fluid flow to or from said control cylinder as directed by said valve means to raise or lower said implement at a predetermined controlled speed, and second valve means in communication with said valve means operative to maintain a pressure differential through said flow control means below a predetermined pressure differential.

2. In an agricultural tractor and implement assembly wherein the tractor has hydraulic power means to raise and lower the implement into and out of engagement with the ground, said hydraulic power means including a fluid actuated single acting control cylinder, a source of fluid, pump means for supplying fluid under pressure to said hydraulic power means to raise said implement, valve means connected between said pump means and said control cylinder for directing fluid between said reservoir and said control cylinder, hitch linkage means connecting said control cylinder and said implement including manually actuatable means for selectively moving said valve means toward a first position for directing fluid from said fluid source to said control cylinder in order to raise said implement and for moving said valve means toward a second position for relieving fluid from said control cylinder in order to lower said implement, the improvement comprising: adjustable flow control means in communication with said valve means and operatively associated with said hydraulic power means whereby fluid flowing to or displaced from said control cylinder must pass through said manually adjustable flow control means, said flow control means being adapted to maintain a constant predetermined rate of fluid flow to and from said control cylinder to raise or lower said implement at a constant predetermined speed as determined by the adjustment of said adjustable flow control means despite variations in the weight of the implement or the downward force thereon.

3. In an agricultural tractor and implement assembly including a hitch linkage connected to said implement, hydraulic power means connected to said hitch linkage to raise and lower the implement into and out of engagement with the ground and means associated with said hydraulic power means to maintain the implement at a predetermined draft as it encounters agricultural working conditions of varying magnitude, said hydraulic power means including a fluid actuated control cylinder connected to said hitch linkage, a fluid reservoir, an engine actuated pump for supplying fluid under pressure from said reservoir to said control cylinder to raise said implement, a manually operable directional flow control valve for directing fluid between said reservoir and said control cylinder, said directional flow control valve including means providing first and second fluid passageways, the improvement comprising: manually adjustable pressure responsive flow rate control means in communication with said directional flow control valve and operatively associated with said hydraulic power means for maintaining a constant predetermined rate of fluid flow to and from said control cylinder, said flow rate control means having means providing an inlet passageway, an outlet passageway and an intermediate passageway, said valve first passageway being connected to said inlet passageway for receipt of fluid under pressure from said directional flow control valve, said outlet passageway being connected to said valve second passageway to receive fluid directed through said flow rate control means whereby fluid is directed from said directional flow control valve into the inlet passageway of said flow rate control means through said intermediate passageway to said outlet passageway in communication with said second passageway of said flow rate control means, whereby fluid directed to or displaced from said control cylinder passes through said flow rate control means maintaining a constant predetermined rate of fluid flow to raise or lower said implement at a constant predetermined speed.

4. In an agricultural tractor and implement assembly wherein the implement is shiftable upwardly and downwardly as it encounters agricultural working conditions of varying magnitude; and wherein the tractor has hydraulic power means to raise and lower the implement into and out of engagement with the ground to maintain a predetermined draft, said hydraulic power means including a fluid actuated control cylinder, a fluid reservoir, pump means for supplying fluid under pressure from said fluid reservoir to said hydraulic power means to raise said implement, control valve means movable to a first position for directing fluid from said fluid reservoir to said control cylinder and movable to a second position relieving fluid from said control cylinder; said tractor having draft control linkage means operatively connected to said implement and responsive to downward movement of said implement for moving said control valve means to said first position and responsive to upward movement of said implement for moving said control valve means to said second position, said linkage means including manually actuated position control means for selectively moving said control valve means to either of said positions, the improvement comprising: flow rate control means operatively associated with said hydraulic power means for maintaining a constant rate of fluid flow to and from said control cylinder, said flow rate control means including a housing means in said housing providing an inlet, an outlet and a connecting passageway, said inlet communicating with said control valve means for receiving fluid under pressure from said reservoir when said control valve means is in said first position, said inlet communicating with said control valve means for receiving fluid displaced from said control cylinder when said control valve means is in said second position, said outlet communicating with said control valve means whereby fluid is directed to said control cylinder when said control means is in said first position and whereby fluid is directed to said reservoir when said control valve means is in said second position, said connecting passageway connecting said inlet and said outlet, flow control means operatively associated with said inlet and said outlet to vary the pressure differential between said inlet and said outlet, pressure responsive means operatively associated with said outlet and responsive to said pressure differential for maintaining a constant rate of fluid flow through said outlet, whereby the raising or lowering of said implement is accomplished at a predetermined speed despite variations in the weight of the implement or the downward force thereon.

5. In a hydraulic draft and position control system for a tractor and implement assembly wherein said implement is shiftable upwardly and downwardly and including draft control means to maintain the implement automatically at a predetermined draft, said hydraulic system including a reservoir for fluid, linkage means connected to said implement for raising and lowering said implement, a fluid actuated control cylinder connected to said linkage means, an engine driven pump means for supplying fluid under pressure from said reservoir to said control cylinder to raise said implement, manually actuatable direction control valve means for directing fluid between said reservoir and said control cylinder, said valve means including means providing an inlet passageway for receipt of fluid under pressure from said pump, a cylinder passageway in communication with said control cylinder and first and second auxiliary passageways the improvement comprising: flow rate control valve means for controlling the rate of fluid flow directed from said reservoir to said control cylinder to raise said implement and to control the rate of flow fluid displaced from said control cylinder to lower said implement, said flow rate control valve means including means providing an inlet chamber in communication with said first auxiliary passageway, an outlet chamber in communication with said second auxiliary passageway and an intermediate chamber connecting said inlet and outlet chambers, said flow rate control valve means including means providing a first and second passageway arranged transverse to said chambers and in communication therewith, manually adjustable pressure differential means positioned in said second passageway and responsive to the flow of fluid through said second passageway to create a pressure differential between said inlet chamber and said intermediate chamber, shiftable pressure responsive means positioned in said first passageway and responsive to said pressure differential to restrict the flow of fluid from said outlet chamber to said second auxiliary passageway of said direction control valve means to achieve a predetermined rate of flow of fluid directed to or displaced from said control cylinder to raise or lower said implement at a predetermined controlled speed.

6. In an agricultural tractor and implement assembly wherein the tractor has hydraulic power means to raise and lower the implement into and out of engagement with the ground, said hydraulic power means including a fluid actuated control cylinder, a fluid reservoir, pump means for supplying fluid under pressure to said control cylinder to raise said implement, and control valve means being movable to a first position for directing fluid from said fluid reservoir to said control cylinder and being movable to a second position for relieving fluid from said control cylinder, the improvement comprising: flow rate control means operatively associated with said hydraulic power means for maintaining a constant rate of fluid flow to and from said control cylinder, said flow rate control means including a housing, means in said housing providing an inlet and an outlet, said inlet communicating with said control valve means for receiving fluid under pressure from said reservoir when said control valve means is in said first position, said inlet communicating with said control valve means for receiving fluid displaced from said control cylinder when said control valve means is in said second position, said housing having an outlet communicating with said control valve means whereby fluid is directed to said control cylinder when said control valve means is in said first position and whereby fluid is directed to said reservoir when said control valve means is in said second position, means in said housing providing an intermediate chamber connecting said inlet and said outlet and providing first and second spaced passageways positioned transverse said inlet and said outlet and in communication therewith; a manually positioned tapered valve spool in said first passageway to produce a pressure differential between said inlet and said intermediate chamber; a flow control piston freely slidable in said second passageway responsive to said pressure differential to vary the size of said outlet to provide a constant predetermined rate of fluid flow through said outlet, whereby the raising or lowering of said implement is accomplished at a predetermined speed; and a pressure compensator valve in communication with said inlet and connected to said reservoir, said compensator valve being responsive to said pressure differential to exhaust fluid under pressure upstream of said inlet when said pressure differential exceeds a predetermined value.

7. In a tractor and implement assembly wherein the implement is shiftable upwardly and downwardly as it encounters agricultural working conditions of varying magnitude; and wherein the tractor has hydraulic power means to raise and lower the implement into and out of engagement with the ground to maintain a predetermined draft, said hydraulic power means including a fluid actuated control cylinder, a fluid reservoir, pump means for supplying fluid under pressure from said fluid reservoir to said hydraulic power means to raise said implement, a first control valve including means providing first and second fluid ports, said valve being movable to a first position for directing fluid from said fluid reservoir to said control cylinder and movable to a second position for relieving fluid from said control cylinder; the improvement comprising: a second control valve operatively associated with said hydraulic power means for maintaining a constant rate of fluid flow to said control cylinder, said second control valve including a housing having means providing an inlet chamber communicating with said first fluid port of said first control valve for receiving fluid under pressure from said reservoir when said first control valve is in said first position, said housing having means providing an outlet chamber in communication with said second fluid port of said first control valve whereby fluid is directed to said control cylinder when said first control valve is in said first position, said housing means providing an intermediate chamber connecting said inlet and said outlet chamber, manually variable flow control means operatively associated with said inlet and said outlet chambers to vary the pressure differential between said inlet and said outlet chambers, pressure responsive means operatively associated with said outlet chamber and responsive to said pressure differential for maintaining a constant rate of fluid flow through said outlet, whereby the raising or lowering of said implement is accomplished at a predetermined speed despite variations in the weight of the implement or the downward force thereon, and a third valve in communication with said first and second fluid ports when said first control valve is in said first position, said third valve having means providing a fluid passageway connected to said reservoir, and a pressure responsive piston slidable within said valve to open said passageway in response to the pressure differential between said first and second fluid ports to permit a flow of fluid under pressure from said port when said pressure differential exceeds a predetermined amount.

References Cited

UNITED STATES PATENTS

| | | | |
|---|---|---|---|
| 3,142,342 | 7/1964 | Brudnak et al. | 172—9 |
| 3,168,146 | 2/1965 | Price et al. | 172—7 |
| 3,235,010 | 2/1966 | North | 172—7 |

ABRAHAM G. STONE, *Primary Examiner.*

WILLIAM A. SMITH, III, *Examiner.*

J. R. OAKS, *Assistant Examiner.*